July 11, 1939.  B. C. PLACE  2,165,765

ADAPTING SHEET METAL DEVICE FOR THREADED FASTENERS

Filed Dec. 19, 1936

Inventor
Bion C. Place

By Strauch & Hoffman
Attorneys

Patented July 11, 1939

2,165,765

UNITED STATES PATENT OFFICE 2,165,765

ADAPTING SHEET METAL DEVICE FOR THREADED FASTENERS

Bion C. Place, Detroit, Mich., assignor to Prestole Devices, Inc., Detroit, Mich., a corporation of Michigan Application December 19, 1936, Serial No. 116,831

4 Claims. (Cl. 85—32)

The present invention is concerned with a device for adapting relatively thin sheet metal for the reception of threaded fasteners and to novel combinations including such a device.

More particularly, the present invention relates to a sheet metal device designed to be non-rotatably secured to a thin sheet metal member, at the point at which a fastener is to be employed to secure it upon a supporting structure, said device strengthening the sheet metal at the point of application of the fastener and at the same time providing a strong self-locking thread for engagement with the screw.

When it is desired to secure two sheet metal structures together by means of threaded fasteners, difficulties arise when one of the structures is so large that it possesses considerable weight, especially if the heavy structure is to be secured to relatively thin sheet metal. Under these conditions the thin sheet metallic structure does not possess sufficient strength to successfully withstand the strain imposed by attaching relatively great weight at localized points thereon. Furthermore bolts and nuts are generally used inasmuch as it has heretofore been regarded as impractical to thread the threaded elements directly in the thin sheet metallic structure. The use of nuts is undesirable because of the labor in applying the nuts and their liability to inadvertently turn on the bolts and thus loosen the connection.

The primary purpose of the present invention is to provide a novel arrangement permitting the attachment of a relatively heavy structure to thin sheet metal, such arrangement permitting the use of threaded fasteners which engage directly with the supporting structure thus obviating the need for nuts.

Still another object of the invention is to provide an improved device for adapting a relatively thin sheet metal structure for the attachment thereto of a supporting structure of relatively great weight without imposing undue strain on any part of the relatively thin sheet metal structure and without the necessity for associating nuts with the threaded fasteners employed.

Another object of the invention is to provide a device for adapting a thin sheet metallic structure for the reception of a threaded fastener, which device is of such character that the strain imposed on the sheet metal structure by substantial weight through the threaded fastener is distributed over a relatively wide area of the sheet metal structure.

Still another object of the invention is to provide a device for adapting a sheet metal structure for the reception of a threaded fastener which is of such nature that it may be secured to the structure by an operation analogous to a riveting operation.

This invention also aims to provide an adaptor for the reception of a screw which adaptor is so designed that it can be conveniently secured in an opening in a thin sheet metal structure and so that the shank of the screw of the threaded fastener will be gripped when it is engaged therewith.

Still another object of the invention is to provide a device for adapting thin sheet metal structures for the reception of a threaded fastener, which device is constructed in cup-shaped form and is designed so that the device may be secured non-rotatably in an opening in the sheet metal structure and extend beyond the inner surface of said structure, so that the disc-like protrusion beyond said surface constitutes, in effect, a washer to separate the sheet metal structure from the part to which it is attached.

Further objects of the invention will appear as a description thereof proceeds with reference to the accompanying drawing, in which.

Like reference characters indicate like parts throughout the several figures.

Figure 1:
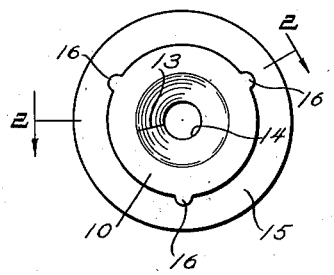
Figure 1 is a plan view looking toward the under side of the preferred form of adaptor device.

The adaptor device, constituting an important part of the present invention, is preferably constructed of sheet metal and consists of a body 10 of cup-like form, the bottom 11 of which is provided with a conical protuberance 12 having a slit 13 extending radially therefrom for a purpose hereinafter described. An opening 14 is formed through the top of the conical protuberance. A flange 15 extends outwardly from the rim of the cup-shaped body 10, and a plurality, preferably three, projections or protuberances 16 are pressed outwardly from the side of the cup-shaped body for a purpose presently to be referred to. The wall of the opening in the top of the conical protuberance 12 is shaped so that it is disposed on a helix having a pitch corresponding approximately to the pitch of the threaded fastener for the reception of which the adaptor is designed.

The adapting device just described may be formed from sheet metal of any desired gauge and composition. Preferably it is constructed from sheet metal possessing adequate strength and the quality of being readily die-shaped into the form already described and of satisfactorily gripping the threaded fastener in a manner presently to be referred to. The adapting device is preferably constructed of metal having a thicker gauge and a better quality than the relatively thin structure with which it is intended to be used, though of course the adapting device and the sheet metal structure, with which it is used, may be made from any material considered desirable or sufficient for the purposes for which the device and structure are intended.

Figure 4:
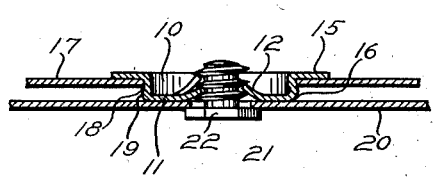
Figure 4 is a sectional view taken on the plane indicated by the line 4—4 in Figure 3.
Figure 3:
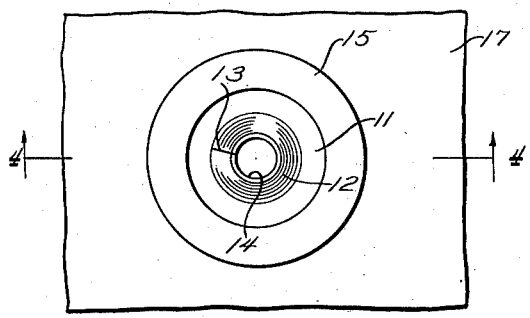
Figure 3 is a plan view of a sheet metal member provided with the adaptor device of Figures 1 and 2.

A preferred way of using the adapting device just described is illustrated in Figures 3 and 4 in which the adaptor device is secured to a sheet metal member 17, having a relatively large opening 18 formed therein of a size just sufficient to receive the cup shaped body 10 of the adapting device. The adapting device is forced in said opening 18, the protuberences or projections 16 biting into the edges of the opening 18 whereby the adaptor is secured from rotation in the opening 18 after it has been forced therein until the flanges 15 thereof contact with the outer surface of the sheet metal structure 17. After the body of the adaptor has been forced into the opening 18, preferably, it is secured therein from withdrawal in the direction opposite to that in which it is applied, by peening or swaging the bottom of the cup-like body laterally, as indicated by 19, in a manner analogous to a riveting operation. This may be accomplished by suitable dies as a part of the operation of inserting the cup shaped body in the opening 18 or it may be accomplished by a separate operation as may be desired. After the adapting device has thus been secured in opening 18 it cannot be turned therein and cannot be removed therefrom so that, in effect, it constitutes a unitary part of the sheet metal structure 17, though for reasons already stated the adapting device possesses superior strength and adaptability for the reception of a threaded fastener presently to be referred to.

The sheet metal member 17 is thus provided at the point intended to receive a threaded fastener with a fastener receiving device with which the threaded fastener may be directly engaged and locked from reverse rotation and which adaptor is capable of sustaining substantial weight inasmuch as the weight is distributed over a relatively large area of the sheet metal member 17, which may not itself be of sufficient strength or quality to withstand such weight if applied at one localized point thereof.

The sheet metal member 17 with the adapting device secured thereto may be used to support a relatively heavy structure such as designated by 20, which structure is provided with an opening 21 for the passage of a threaded fastener 22. For example, the sheet metal structure 20 may be the relatively heavy fender of an automobile while the metal member 17 may be a portion of the sheet metal body thereof. The parts just referred to may be secured together by the threaded fastener 22 by passing the shank of the latter through the opening 14 in the adapting device, which latter opening is brought into alignment with the opening 21 prior to the application of the threaded fastener. A threaded fastener is selected having a coarse thread. The pitch of the thread, preferably, substantially exceeds the thickness of the metal from which the adapting device is constructed so that the helical wall of the opening 14 in the adapting device enters completely between adjacent threads of the threaded fastener, and so that the thread substantially laps the upper surface of the device. The threaded fastener is turned until the parts are in firm engagement with each other, whereupon further rotation of said fastener results in a flattening of the conical protuberance causing a contraction of the opening 14, and a firm frictional engagement between the wall of said opening and the shank of the fastener at the base of the thread. This results in the application of a locking effect to the threaded fastener preventing reverse rotation thereof in the manner more fully described in my copending application Serial No. 87,292, filed June 25, 1936.

As described in the latter application, the opening in the bottom of the cup-shaped adapting device is made substantially smaller than the opening 14 formed by pressing the conical protuberance inwardly from the bottom of the cup, such pressing action resulting in an enlargement of the opening to the size of the shank of the fastener for which the device is designed, measured at the base of the thread. The radially extending slit 13 permits the passage of a thread of the screw in turning the fastener through the opening 14, and, as already stated, upon a flattening of the conical protuberance as an incident to the tightening of the threaded fastener, the opening is contracted towards its initially smaller size, thus causing a firm binding of the adjacent portions of the conical protuberance against the shank of the screw at the base of the threads thereof.

Of course, it will be understood that as many adapting devices are applied to the sheet metal member as are necessary to receive the number of fasteners employed in securing the structure 20 thereto, and that said adapting devices are located at the points at which the fastening devices are to be applied. While one use of the present invention has been above specified, it is understood that it is capable of a wide use in many analogous situations.

Figure 5:
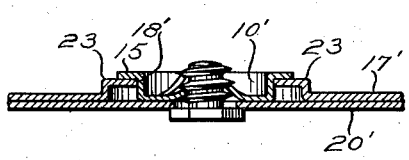
Figure 5 is a view corresponding to Figure 4, but showing a modified construction.

In the modified form of the invention illustrated in Figure 5 of the drawing, an arrangement is disclosed in which the sheet metallic member 17', contacts with the structure 20' except adjacent the adapting device 10', the bottom of which is disposed in the plane of the inner surface of the sheet metallic member 17'. This is accomplished by embossing or offsetting the portion of the sheet metal member 17' adjacent the opening 18' therein, as indicated by 23. Preferably the embossment 23 is formed in the same operation resulting in the formation of the opening 18'. The cup-like adapting device fits snugly in the opening 18' and may be secured therein in any suitable manner as by welding or the like. The member 17' and the structure 20' are secured together by means of a threaded fastener engaging with a specially formed opening in the bottom of the cup-like adapting device 10' formed in the manner already described.

Figure 2:
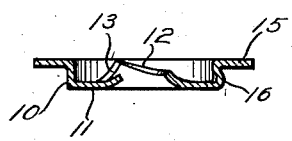
Figure 2 is a sectional view taken on the plane indicated by the line 2—2 of Figure 1.
Figure 6:
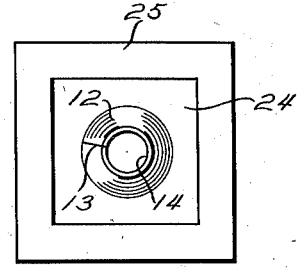
Figure 6 is a view similar to Figure 1, showing a modified form of adaptor device.

If desired, the adapting device may be made rectangular in outline as illustrated in Figure 6 of the drawing, and rectangular openings may be provided in the sheet metal member for the reception of the cup-shaped body thereof. The device of Figure 6 differs from that illustrated in Figures 1 and 2 only in that the cup-like body 24 is rectangular or square in plan, and the flange 25 extending from the rim thereof is correspondingly shaped in outline. The conical protuberance in the bottom of the cup, the opening therein and the slit extending radially therefrom are preferably exactly the same as in the form of the invention illustrated in Figures 1 and 2 and the same numerals have been applied thereto.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device to adapt a relatively thin sheet metal structure for the reception of a screw comprising a cup-shaped, metal member having a conical protuberance in its bottom wall extending within the cup, an opening in the top of said protuberance and a slit extending radially of said opening, the wall of said opening being disposed on a helix having the pitch of said screw, and means for securing said member to said thin metal structure to prevent lateral movement and dissociation of said device from said structure including a peripheral flange extending outwardly from the top of the cup-shaped member.

2. A device to adapt a thin sheet metal structure provided with an aperture for the reception of a screw, comprising a cup-shaped member including a substantially flat bottom, side walls and a peripheral flange, means deformed from said side walls and adapted to bite into said thin sheet metal structure and prevent rotative movement of said device with respect to said structure, a split conical protuberance formed in said bottom and having an opening in the top thereof, the wall of said opening being disposed on a helix having the pitch of said screw, and means including said side walls and said flange for preventing movement of said device in a direction normal to the plane of said structure.

3. A sheet metal screw receiving element for adapting flimsy sheet metal structures for the reception of a screw, comprising a cup-shaped sheet metal member having a peripheral flange at its open end, side walls and a relatively flat bottom, means on said side walls for engaging the walls of an aperture provided in said structure so as to prevent rotative movement of said element after said element is inserted in said aperture from one side of said structure, means including said side walls and said flange for preventing withdrawal of said element from said aperture in the direction opposite to that in which it is applied, and a split conical protuberance pressed from said bottom and having an opening in the top thereof, the wall of said opening being disposed on a helix having the pitch of said screw.

4. The combination defined in claim 3 wherein the metal around the opening in said protuberance is of such a thickness that the helical wall of said opening enters completely between adjacent threads of said screw.

BION C. PLACE.